Patented Nov. 16, 1943

2,334,390

UNITED STATES PATENT OFFICE 2,334,390

WATER-INSOLUBLE OXYALKYLATED DRASTICALLY OXIDIZED CASTOR OIL AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application July 7, 1941, Serial No. 401,382. Divided and this application November 30, 1942, Serial No. 467,474

5 Claims. (Cl. 260—406)

This invention relates to a new chemical product or compound and to the manufacture of same, our present application being a division of our co-pending application Serial No. 401,382, filed July 7, 1941, which subsequently matured as U. S. Patent No. 2,307,494, dated January 5, 1943.

One object of our invention is to provide a new chemical product or compound that is particularly adapted for use as a demulsifier in the resolution of crude oil emulsions.

Another object is to provide a practicable method for manufacturing said new chemical product or compound.

Although one of the primary objects of our invention is to provide a new compound or composition of matter that is an efficient demulsifier for crude oil emulsions of the water-in-oil type, the said compound or composition of matter may be employed in other arts, as hereinafter indicated. It also may have additional uses in various other fields which have not yet been investigated.

The composition of matter herein contemplated, and particularly for use as a demulsifier, is obtained by the oxyalkylation of blown or oxidized castor oil to a point definitely short of water-solubility.

It is well known that oxidized oils can be obtained from castor oil ricinoleic acid and various derivatives of ricinoleic acid, such as: Monoricinolein, diricinolein and polyricinoleic acids. They are produced by the common practice of blowing or oxidizing castor oil and similar fatty oils or acids, particularly non-drying unsaturated fatty oils, by means of a gaseous medium, such as air, oxygen, ozone, or ozonized air. The gaseous medium, such as air, may be moist or dry and the oxidation may take place in the presence or absence of a catalyst. The catalyst may be of a metallic type, such as lead ricinoleate, cobalt ricinoleate, manganese ricinoleate, etc.; or it may be of the organic type which produces peroxide, such as alpha pinene, linseed oil, etc. Oxidation may take place at atmospheric pressure or superatmospheric pressure, i. e., pressures up to or including 200 pounds gauge pressure, and at any temperature slightly above the boiling point of water, for instance, 120° C., up to any temperature which does not produce undue decomposition by pyrolytic reaction.

The time of blowing may be fairly brief, for example, 8–10 hours; or it may be quite extensive, for instance, as long as 10–12–14 days, the longer time periods being employed generally when the temperature is just slightly above the boiling point of water and when oxidation is with air at atmospheric pressure.

Mild oxidation, i. e., oxidation as exemplified by the exposure of a film of castor oil to air, for an extended period of time, such as weeks, or even months (see Chemical Technology and Analysis of Oils, Fats, and Waxes, by Lewkowitsch, sixth edition, volume 2, page 406), produces relatively small modifications of certain important indices, such as the iodine value, the acetyl value, and the saponification value. If drastic oxidation takes place, either by continued mild oxidation, or by more vigorous oxidation from the very beginning of the reaction, as induced by either a higher reaction temperature or the presence of a catalyst, then there is obtained an oxidized oil having characteristics which clearly indicate that drastic oxidation has taken place. These indices of drastic oxidation are a relatively low iodine value, such as 70 or less, and may be as low as 40, or thereabouts; a saponification value of 215 to 283, or thereabouts; an acetyl value of approximately 160–200; an increased viscosity such that the material may be hardly mobile at ordinary temperatures; a specific gravity of almost one, or a trifle over one at times; an increased refractive index; and, in the absence of other coloring matter, a yellow to deep orange color. The color at times may be a questionable index, since some oxidized castor oils are bleached to make them particularly adaptable for use as plasticizers in light colored resinoid bodies.

Drastically-oxidized castor oil can be prepared by well known methods, or such products can be purchased in the open market under various trade names, such as "blown castor oil," "blended castor oil," "blended bodied castor oil," "processed castor oil," "oxidized castor oil," "heavy castor oil," "viscous castor oil," etc. These various trade names appear to be applied to drastically-oxidized castor oils which differ merely in degree, but not in kind.

The color of these oils is still pale or light colored in comparison with the oil from which they have been derived. Usually, they are fairly transparent, particularly in reasonably thin layers, for instance, an inch or less. Such oils represent greater or lesser degrees of partial oxidation in the sense that there is a drastic change in comparison with the change that takes place when a film of castor oil is exposed to air.

For the sake of differentiation, oils of the kind previously described will be referred to as pale blown, drastically-oxidized castor oils; and the same terminology is intended to apply to all other ricinoleic bodies of the kind hereinafter described. In addition to pale blown, drastically-oxidized castor oil, there is also another type of the kind described in U. S. Patent No. 2,023,979, to Stehr, December 10, 1935. The product described in said Stehr patent is characterized by the fact that drastic oxidation is continued past the stage where a pale blown oil is obtained and where, as a matter of fact, a super oxidized product of almost semi-livery consistency is obtained.

Such products are usually much darker in color than the pale blown castor oils, for the reason that certain side reactions occur with the formation of dark colored by-products; and as a result, the transparency of the oil has greatly decreased or disappeared, and it is apt to be opaque in nature.

Attention is directed particularly to U. S. Patent No. 2,183,487, dated December 12, 1939, to Colbeth, to the extent that it discloses details as to the oxidation of castor oil in a manner that is particularly desirable.

Our preference is to subject a pale blown castor oil of the following characteristics, to oxyalkylation, particularly oxyethylation:

| | |
|---|---|
| Acid number | 15.1 to 25.0 |
| Saponification number | 230.5 to 274.0 |
| Iodine number | 43.5 to 55.0 |
| Acetyl number | 164.0 to 192.0 |
| Hydroxyl number | 188.0 to 220.0 |
| Percent unsaponifiable matter | 1.1 |
| Percent nitrogen | 0.0 |
| Percent $SO_3$ | 0.0 |
| Percent ash | Trace |

It is well known that if triricinolein, preferably in the form of castor oil, is treated with an oxyalkylating agent, particularly ethylene oxide, propylene oxide, butylene oxide, glycidol, or the like, and if one employs a large molecular proportion of the oxyalkylating agent for each mole or occurrence of the ricinoleyl radical, that one can convert castor oil into a water-soluble product. The conventional procedure is well known, and generally speaking, involves nothing more nor less than heating castor oil in the presence of successive small amounts of alkylene oxide or the like, under comparatively low pressures and fairly low temperatures, and usually in the presence of an alkaline catalyst, as, for example, sodium ricinoleate. The temperatures employed are generally above 100° C. and below 200° C. The pressures employed are generally above 100 lbs. gauge and below 300 lbs. gauge pressure. Sometimes oxyalkylation is conducted in a continuous manner by introduction of the ethylene oxide in a gaseous state. More frequently, and most conveniently, the oxide is introduced in a liquid form in a comparatively small amount, for instance, 300 lbs. of castor oil and 30 lbs. of ethylene oxide, along with approximately one pound of sodium ricinoleate. Reaction is allowed to take place under pressure in the manner above described until all the ethylene oxide is absorbed. Another portion of ethylene oxide is added, and the procedure repeated until water solubility is obtained. Not infrequently as many as 30 lbs. moles of the oxyalkylating agent are employed for one pound mole of triricinolein, in order to obtain complete water solubility. Needless to say, ethylene oxide promotes solubility in lower molecular proportions than propylene oxide or butylene oxide. Furthermore, ethylene oxide is preferable, due to its greater reactivity.

We have found that if one oxyalkylates blown or oxidized castor oil with any of the usual oxyalkylating agents indicated, particularly ethylene oxide, to a point short of water solubility, one obtains a product which has particular merit as a demulsifier, and also has utility in arts where blown castor oil is sometimes employed, as, for example, as a plasticizer in the manufacture of various plastics; as an ingredient in furniture polish, etc.

In the manufacture of such oxyalkylated blown castor oils, we prefer, for the sake of convenience, to consider the molecular weight of the blown castor oil the same as if it were unmodified triricinolein. This is not strictly correct, but it is convenient, thus subsequent reference to one pound mole of blown castor oil is intended to mean 944 lbs. Our preference is to treat one pound mole of castor oil with approximately three, six, or nine moles of ethylene oxide. Drastic oxyethylation may introduce as many as 18 or 20 moles of ethylene oxide, without yielding a water-soluble product. In the event propylene oxide or butylene oxide is employed, a greater molar ratio of the alkylene oxide can be employed, but greater difficulty is incurred, because such reactants combine less readily than ethylene oxide. It is to be noted that we are concerned with oxyalkylation to a degree short of water solubility.

*Composition of matter, Example 1*

One pound mole of pale blown castor oil of the kind described by the above table is reacted with three pound moles of ethylene oxide, in the presence of ½ of 1% of sodium stearate as a catalyst.

*Composition of matter, Example 2*

Same procedure is followed as in Example 1, preceding, except that 6 pound moles of ethylene oxide are employed.

*Composition of matter, Example 3*

Same procedure is followed as in Example 1, preceding, except that 9 pound moles of ethylene oxide are employed.

We have found that the particular chemical compounds or reagents herein described, and particularly desirable for use as demulsifiers, may also be used for other purposes, for instance, as a break inducer in doctor treatment of the kind intended to sweeten gasoline. Other uses include employment as a component of furniture polishes, and as a plasticizer in resin manufacture.

Having thus described our invention, what we claim as new and desire to secure by Letters Patent is:

1. A new composition of matter consisting of a water-insoluble oxyalkylated drastically-oxidized castor oil.

2. A new composition of matter consisting of a water-insoluble oxyethylated drastically-oxidized castor oil.

3. A new composition of matter consisting of a water-insoluble oxyethylated drastically-oxidized pale blown castor oil.

4. A new composition of matter consisting of a water-insoluble oxyethylated drastically-oxidized castor oil of the pale blown type; the oxyalkylation of said castor oil involving at least three and not more than nine moles of ethylene oxide for each mole of triricinolein employed prior to oxidation.

5. In the manufacture of a composition of matter as defined in claim 1, the step of oxyalkylating a drastically-oxidized castor oil to a point short of water solubility.

MELVIN DE GROOTE.
BERNHARD KEISER.